US011987343B2

(12) United States Patent
Honorato Ruiz et al.

(10) Patent No.: US 11,987,343 B2
(45) Date of Patent: May 21, 2024

(54) AIRCRAFT EMPENNAGE WITH A HORIZONTAL STABILIZER INTERFACING AT THE VERTICAL STABILIZER ROOT

(71) Applicant: Airbus Operations S.L.U., Getafe (ES)

(72) Inventors: Francisco Javier Honorato Ruiz, Getafe (ES); María Muruzabal Sopelana, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 380 days.

(21) Appl. No.: 17/526,394

(22) Filed: Nov. 15, 2021

(65) Prior Publication Data
US 2022/0250735 A1    Aug. 11, 2022

(30) Foreign Application Priority Data

Feb. 10, 2021  (EP) ..................................... 21382102

(51) Int. Cl.
| | |
|---|---|
| *B64C 1/26* | (2006.01) |
| *B64C 1/06* | (2006.01) |
| *B64C 5/02* | (2006.01) |
| *B64C 5/10* | (2006.01) |
| *B64C 5/16* | (2006.01) |
| *B64C 9/00* | (2006.01) |
| *B64C 13/24* | (2006.01) |
| *B64C 1/00* | (2006.01) |

(52) U.S. Cl.
CPC ................ *B64C 1/26* (2013.01); *B64C 1/065* (2013.01); *B64C 5/02* (2013.01); *B64C 5/10* (2013.01); *B64C 5/16* (2013.01); *B64C 9/00* (2013.01); *B64C 13/24* (2013.01); *B64C 2001/0072* (2013.01); *B64C 2001/0081* (2013.01)

(58) Field of Classification Search
CPC .... B64C 5/10; B64C 5/16; B64C 5/02; B64C 1/26; B64C 5/06
See application file for complete search history.

(56) References Cited

U.S. PATENT DOCUMENTS

2016/0325821 A1   11/2016   Golshany et al.

FOREIGN PATENT DOCUMENTS

| DE | 102005003297 A1 | 7/2006 |
| EP |     3090939 A1  | 11/2016 |

OTHER PUBLICATIONS

European Search Report; priority document.

*Primary Examiner* — Nicholas McFall
*Assistant Examiner* — Terri L Filosi
(74) *Attorney, Agent, or Firm* — Greer, Burns & Crain, Ltd.

(57) ABSTRACT

An aircraft empennage includes a vertical tail plane, a rear fuselage section attached to the vertical tail plane and including a skin and internal reinforcing members, a horizontal tail plane comprising two lateral torsion boxes and a framework located between the two lateral torsion boxes comprising a front spar, a rear spar and two ribs extending between the front and the rear spar and each adjacent to a lateral torsion box. The framework encloses a portion of the vertical tail plane along its spanwise direction. The aircraft empennage includes an attachment assembly attaching the framework to the rear fuselage section, the attachment assembly crossing the skin and extends between the internal reinforcing members of the rear fuselage section and the framework.

15 Claims, 8 Drawing Sheets

AIRCRAFT EMPENNAGE WITH A HORIZONTAL STABILIZER INTERFACING AT THE VERTICAL STABILIZER ROOT

CROSS-REFERENCES TO RELATED APPLICATIONS

This application claims the benefit of the European patent application No. 21382102.8 filed on Feb. 10, 2021, the entire disclosures of which are incorporated herein by way of reference.

FIELD OF THE INVENTION

The present invention relates to an aircraft empennage or tail configuration. The aircraft empennage comprises the horizontal tail plane (HTP) located at the vertical tail plane (VTP) root area.

BACKGROUND OF THE INVENTION

The empennage, also known as tail, tail assembly or tail configuration, is a structure at the rear of an aircraft that provides stability during take-off and flight.

The empennage is the whole tail structure and comprises the rear fuselage, the vertical stabilizer or vertical tail plane (VTP) and the horizontal stabilizer or horizontal tail plane (HTP). It also includes the rudder and elevators.

The optimization of the wet surfaces along with the weight and size of the horizontal tail plane (HTP) and the vertical tail plane (VTP) is relevant to improve aircraft performance.

Various configurations of tail assemblies can be found in the literature for commercial and defense aircrafts. The three most relevant tail assemblies are explained below: Conventional, T-Tail and Cross-Tail.

While the position of the vertical tail plane (VTP) is the same in all three configurations mentioned, the position of the horizontal tail plane (HTP) varies from the top of the vertical tail plane (VTP) structure to the middle section of the rear fuselage.

These positions not only modify the aerodynamics of the whole aircraft, but also affect the rear fuselage and vertical tail plane (VTP) structures. The area where the horizontal tail plane (HTP) is attached must be reinforced, which increases the weight and cost of the aircraft.

Conventional Tail

The Conventional tail is the most common configuration of the empennage in commercial aircraft. This kind of tail comprises the vertical tail plane (VTP) joined to the upper area of the rear fuselage. The horizontal tail plane (HTP) is attached to the internal structure of the rear fuselage.

The attachment of the horizontal tail plane (HTP) to the middle section of the rear fuselage is performed by several fittings and structural bars connected to the inner frame of the rear fuselage.

Since the horizontal tail plane (HTP) is typically trimmable, it is necessary to modify the rear fuselage at the interface with the horizontal tail plane (HTP) to allow its movement as follows:

A significant cut-out in the rear fuselage is required to locate the horizontal tail plane (HTP) and to provide sufficient clearance to avoid any clash during its trimming movement. Several reinforcements are performed as beams and high loaded frames to reinforce this cut-out and redistribute the loads.

The last frame of the rear fuselage is left open to introduce the horizontal tail plane (HTP) into the rear fuselage during final assembly operations of the aircraft. It penalizes the structural efficiency of the rear fuselage. The last frame is closed by a lattice structure to fulfill interchangeability requirements to replace the horizontal tail plane (HTP) if needed.

The rear fuselage aerodynamic contour is modified around the cut-outs. A double curvature area is performed to make it compatible with the trimming movement of the horizontal tail plane (HTP). The double curvature area also minimizes parasite aerodynamic drag, thanks to the local installation of a fairing.

The main disadvantages of the Conventional tail, with respect to the structure, use and aerodynamics of the aircraft are:

Since the connection between the horizontal tail plane (HTP) and the rear fuselage is performed inside the fuselage, a significant part of the horizontal tail plane (HTP) is hidden inside the rear fuselage. This hidden part is not useful for aircraft control. Therefore, the total size of the horizontal tail plane (HTP) is increased to compensate for this non-wetted area, penalizing the component drag, weight and cost.

As the horizontal tail plane (HTP) is partially located inside the rear fuselage, this fuselage section is highly penalized in terms of weight and cost, due to the additional structural reinforcement needed to redistribute the loads around the cut-out area. Additionally, a strut structure in the closing frame is used due to the horizontal tail plane (HTP) interchangeability requirements, which is not the optimal solution in terms of weight.

The manufacturing and assembly of the rear fuselage is penalized due to the high complexity involved in the production process of the double curvature shape around the cut-out area.

In addition, the use of the fuselage interior to accommodate the horizontal tail plane (HTP) junction eliminates the possibility of using that space for other purposes, such us the location of the auxiliary power unit (APU), passenger boarding, systems allocation, etc. It reduces the effective capacity of the aircraft and make it necessary to enlarge the fuselage to locate them impacting on drag, weight and cost.

Due to the low position of the horizontal tail plane (HTP), the possibility of impact from different objects projected from the runway and of accidents during ground operations is higher than in other empennage configurations.

T-Tail

T-Tail configuration is used in cases where the engines are placed in the tail cone, or the wings are placed high or the space inside the rear fuselage is needed.

In this configuration, the horizontal tail plane (HTP) is attached to the vertical tail plane (VTP) at its upper part, which generates the T shape that gives the name to this configuration.

The main disadvantages of the T-Tail configuration are:

The location of the horizontal tail plane (HTP) at the top of the vertical tail plane (VTP) represents an increase in the loads that the vertical tail plane (VTP) must bear. Firstly, because the weight and loads of the horizontal tail plane (HTP) must be carried by the vertical tail plane (VTP) structure. Secondly, because the pivot point's distance in a trimmable horizontal tail plane (HTP) is much lower as its attachment is located in the narrowest area of the vertical tail plane (VTP), which increases the bending and twisting loads. Consequently, the vertical tail plane (VTP) structure is penalized in terms of weight and cost.

Since the attachment of the horizontal tail plane (HTP) is performed at the top of the vertical tail plane (VTP), the horizontal tail plane (HTP) lateral loads cannot be adequately supported. Therefore, the fittings must bear higher lateral loads at the same point. This fact increases the complexity of the structure and makes high performance materials necessary, which penalizes the weight and cost of the structure.

Furthermore, the maintenance of the horizontal tail plane (HTP) is complicated due to its higher position.

Cross-Tail

An intermediate solution between the Conventional and the T-Tail is found in the Cross-Tail. The horizontal tail plane (HTP) crosses the vertical tail plane (VTP) near its middle part. It represents a compromise between the two before explained configurations.

In this configuration, the loads from the horizontal tail plane (HTP) are transmitted to the vertical tail plane (VTP). To reinforce the lower section of the vertical tail plane (VTP) is required.

When installing the horizontal tail plane (HTP), the load path of spars, stringers, and skins of the vertical tail plane (VTP) is interrupted. After installing the horizontal tail plane (HTP), this load path is restored by means of several reinforcements.

The main disadvantages of the Cross-Tail empennage are:

The structure of the lower portion of the vertical tail plane (VTP) must be designed stiffer and stronger due to the high loads it bears. This increases its weight and cost.

Since the attachment of the horizontal tail plane (HTP) is performed at the middle part of the vertical tail plane (VTP), the horizontal tail plane (HTP) lateral loads cannot be adequately supported. Consequently, the fittings must bear higher lateral loads at the same point. This fact increases the complexity of the structure and makes high performance materials necessary, which penalizes the weight and cost of the structure.

The vertical tail plane (VTP) is cut into two different parts by the horizontal tail plane (HTP). Several reinforcements are required to ensure the load transfer from the tip to the root of the vertical tail plane (VTP). Therefore, the overall vertical tail plane (VTP) weight and cost increases.

In case of a trimmable horizontal tail plane (HTP), the external surface and the internal structure of the vertical tail plane (VTP) must be modified to locate the trimming actuator. Big holes in the vertical tail plane (VTP) ribs are performed to avoid any clash with the screw jack connection. This fact penalizes the overall vertical tail plane (VTP) weight and increases the complexity of the vertical tail plane (VTP) design and maintenance.

SUMMARY OF THE INVENTION

An object of this present invention is to provide a configuration of the aircraft empennage that improves the horizontal tail plane (HTP) efficiency without penalizing the surrounding components, mainly the vertical tail plane (VTP) and rear fuselage section.

The aircraft empennage object of the invention is an empennage with a horizontal stabilizer interfacing at the vertical stabilizer root.

The aircraft empennage object of the invention comprises:

A vertical tail plane (VTP).

A rear fuselage section. This rear fuselage section comprises skin and internal reinforcing members, i.e., reinforcing members located on the side of the skin towards the median plane of the fuselage section. For instance, frames and stringers. The vertical tail plane is attached to the rear fuselage section by means of an attachment assembly extending from the internal reinforcing members to the vertical tail plane (VTP). Thus, part of the attachment assembly crosses the skin of the rear fuselage section.

A horizontal tail plane (HTP). The horizontal tail plane (HTP) may be trimmable or fixed.

The horizontal tail plane (HTP) comprises:

Two lateral torsion boxes.

A framework located between the two lateral torsion boxes; the framework being connected to the two lateral torsion boxes. The framework comprises a front spar, a rear spar and two ribs extending or spanning between the front spar and the rear spar. Each rib is adjacent, i.e., not distant or not situated at a great distance, to a lateral torsion box. Thus, the framework is a parallelogram, i.e., it comprises four sides. The framework is hollow and encloses a portion of the vertical tail plane (VTP) along the spanwise direction of the vertical tail plane (VTP). Therefore, the framework of the horizontal tail plane (HTP) surrounds a longitudinal section of the vertical tail plane (VTP). A cross-section of the vertical tail plane (VTP) is surrounded or enclosed by the parallelogram formed by the two spars and the two ribs. In this way, the vertical tail plane (VTP) crosses the horizontal tail plane (HTP), specifically through the opening formed by the framework.

As known, in a horizontal tail plane (HTP) spars run spanwise to the horizontal plane (HTP) and ribs run chordwise. Therefore, the front and rear spar of the framework are located spanwise to the horizontal tail plane (HTP) and the two ribs are located chordwise to the horizontal tail plane (HTP).

The aircraft empennage comprises an attachment assembly attaching the framework to the rear fuselage section. The attachment assembly extends between the internal reinforcing members of the rear fuselage section and the framework and, therefore, the attachment assembly crosses the skin of the rear fuselage section. In an embodiment, the attachment assembly may be attached to a frame of the rear fuselage section.

In an embodiment, the attachment assembly attaching the framework to the rear fuselage section comprises:

A rear attachment extending between the internal reinforcing members of the rear fuselage section and the rear spar of the framework and crossing the skin. For instance, the rear attachment may protrude from the skin towards the framework of the rear fuselage section.

A front attachment extending between the internal reinforcing members of the rear fuselage section and the front spar of the framework and also crossing the skin.

One of the advantages of the invention is that, in an embodiment, it allows the horizontal tail plane (HTP) to be positioned at the vertical tail plane (VTP) root area to allow both:

to have the horizontal tail plane (HTP) entirely outside of the rear fuselage section, to avoid the impact of the horizontal tail plane (HTP) structure and loads on the vertical tail plane (VTP).

The root area is the part of the vertical tail plane (VTP) that is closest to the rear fuselage section. The opposite end of the vertical tail plane (VTP) from the root is the tip.

The vertical tail plane root area covers up to the 10% or 15% of the spanwise length of the vertical tail plane (VTP) measured from the skin of the rear fuselage section.

In an embodiment, the framework of the horizontal tail plane is located adjacent to the skin of the rear fuselage section with respect to the vertical direction of the aircraft empennage. Adjacent means that it is located not distant to the skin. The distance may vary between both elements from being in contact to having a clearance between them.

The interfaces of the horizontal tail plane (HTP) and of the vertical tail plane (VTP) with the rear fuselage section are performed by means of the framework to avoid any clash between both components.

In addition, the attachments of the horizontal tail plane (HTP) and of the vertical tail plane (VTP) to the rear fuselage section are located in a single area, minimizing the reinforcements required for the structure, decreasing the overall weight and cost.

More particularly, the above-mentioned technical features stablish the horizontal tail plane (HTP)-vertical tail plane (VTP)-rear fuselage section interfaces as follows.

Horizontal Tail Plane (HTP)-Rear Fuselage Section Interface

The horizontal tail plane (HTP) structure comprises two lateral torsion boxes joined to the framework located between both lateral torsion boxes. This framework is connected to the rear fuselage section through an attachment assembly.

In an embodiment, the horizontal tail plane (HTP) may be trimmable. The connection between the rear attachment of the attachment assembly and the framework is configured to be a pivot of the trimmable horizontal tail plane and the front attachment is configured to move the trimmable horizontal tail plane around the pivot to control the angle of rotation of the horizontal tail plane.

In an embodiment, the front attachment is an endless screw. In an embodiment, the rear attachment comprises two lugs. The endless screw is connected to a trimmable horizontal stabilizer actuator (THSA) to control the angle of rotation.

Horizontal Tail Plane (HTP)-Vertical Tail Plane (VTP) Interface

Once the horizontal tail plane (HTP) is attached to the rear fuselage section, the vertical tail plane (VTP) is placed inside the framework. The vertical tailplane (VTP) keeps the same interface design solution to be attached to the rear fuselage section known in the state of the art.

In case of a trimmable horizontal tail plane (HTP), since the horizontal tail plane (HTP) moves with respect to the vertical tail plane (VTP) and the rear fuselage, a standard clearance is left between the framework and the other two structures to avoid any clash.

In the embodiment where the horizontal tail plane (HTP) is trimmable and it is located in the root area of the vertical tail plane (VTP), the distance between the horizontal tail plane (HTP) in a straight position and the skin of the rear fuselage section is determined by the maximum trimming angle of the horizontal tail plane (HTP). This maximum angle defines the necessary distance from the skin according to the fixing points and the size of the horizontal tail plane (HTP).

Horizontal Tail Plane (HTP) Framework

The horizontal tail plane (HTP) framework comprises two spars, front and rear, and two ribs, left and right.

In an embodiment, in order to attach the horizontal tail plane (HTP) lateral boxes to the framework, the front spars of the lateral boxes and the front spar of the framework are connected, and the rear spars of the lateral boxes and the rear spar of the framework are connected.

The invention achieves several advantages with respect to the solutions known from the state of the art. The most important are savings in terms of drag, weight and industrial costs, also including some configuration opportunities, as detailed below:

As the horizontal tail plane (HTP) is located outside of rear fuselage section, the entire surface of the horizontal tail plane (HTP) is wet. This makes it possible to have a smaller horizontal tail plane (HTP) with the same handling qualities, reducing drag, weight, and cost.

The claimed configuration has a better structural efficiency than Cross-Tail and T-Tail. The horizontal tail plane (HTP) structure and loads do not impact on the vertical tail plane (VTP). It is not necessary to make the vertical tail plane (VTP) stiffer to support the loads from the horizontal tail plane (FTP). It is not necessary to interrupt the vertical tail plane (VTP) loads path.

As the horizontal tail plane (HTP) is located outside the rear fuselage section, the fuselage weight and cost are optimized due to the structural efficiency improvement (standard closing frame, no cut-out, . . . ), and due to the removal of the cut-out structural reinforcements. Besides of this, the rear fuselage contour is not penalized by the cut-out and its local double curvature. It is therefore less complicated to manufacture and assembly the rear fuselage structure. Thus, it is feasible to reduce labor hours and materials needed in the production line.

As the structural attachments for both the vertical tail plane (VTP) and the horizontal tail plane (HTP) are defined in the same place, it is only necessary to reinforce the upper shell of the rear fuselage. Therefore, it optimizes the structural efficiency and achieves savings compared with other configurations in which several local reinforcements are required throughout the rear fuselage section due to the different load introduction locations.

Maintainability is similar to the Conventional and Cross-Tail configuration and better than the T-Tail due to the horizontal tail plane (HTP) location in the root area of the vertical tail plane (VTP). This location is less prone to suffer accidental damages than in the Conventional configuration thanks to its higher distance to the ground.

As there is more space available inside the rear fuselage section, it could be used for different purposes, for instance, auxiliary power unit (APU) location, passenger boarding, systems allocation, etc. It is possible to reduce the overall fuselage length and, consequently, the weight, cost and drag.

There is a weight increase associated to the horizontal tail plane (HTP) framework due to the high stiffness requested and to the use of a framework instead of a single center joint. Despite this, this weight penalty is fully compensated or counterbalanced by the weight savings achieved thanks to the removal of the rear fuselage cut-out reinforcements and the overall reduction of the horizontal tail plane (HTP) size, achieving an overall weight saving.

BRIEF DESCRIPTION OF THE DRAWINGS

To complete the description and to provide for a better understanding of the invention, a set of drawings is provided. Said drawings form an integral part of the description and illustrate preferred embodiments of the invention. The drawings comprise the following figures.

DETAILED DESCRIPTION OF THE PREFERRED EMBODIMENTS

Figure 1:
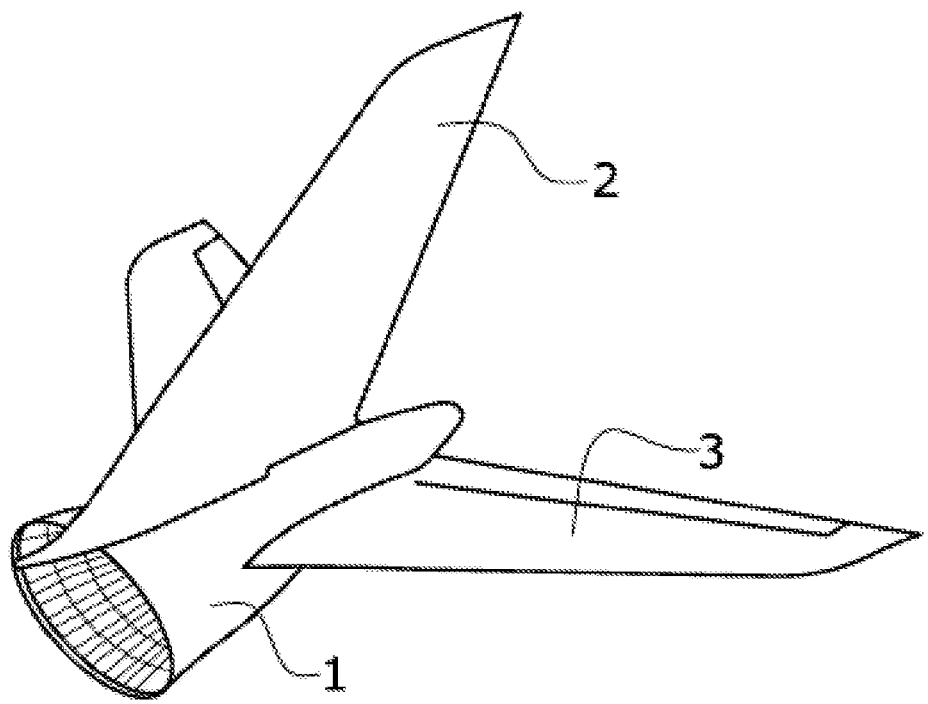
FIG. 1 shows a perspective view of an aircraft empennage known in the state of the art as Conventional tail.

FIG. 1 discloses a Conventional tail known in the state of the art. This kind of tail comprises the vertical tail plane (VTP) (2) joined to the upper area of the rear fuselage section (1) and the horizontal tail plane (HTP) (3) crosses and is attached to the internal structure of the rear fuselage section (1).

Figure 2:
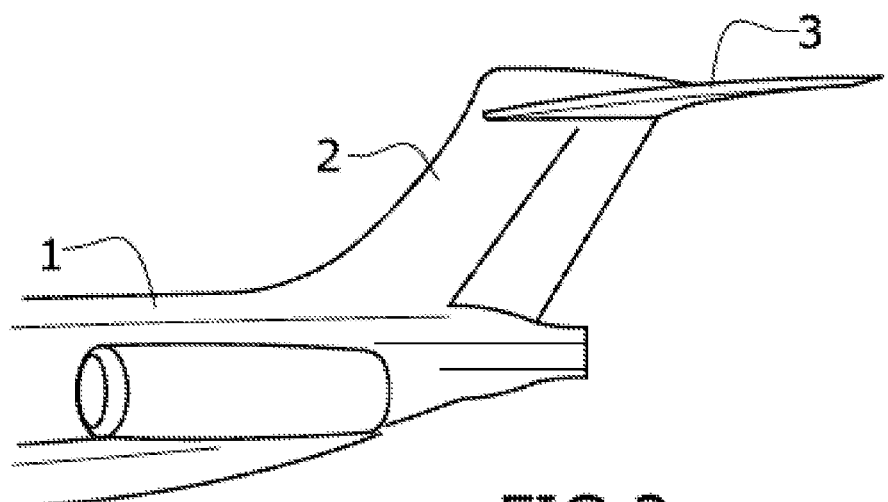
FIG. 2 shows a lateral view of an aircraft empennage known in the state of the art as T-tail.

FIG. 2 discloses a T-Tail configuration known in the state of the art. In this configuration, the horizontal tail plane (HTP) (3) is attached to the vertical tail plane (VTP) (2) at its upper part.

Figure 3:
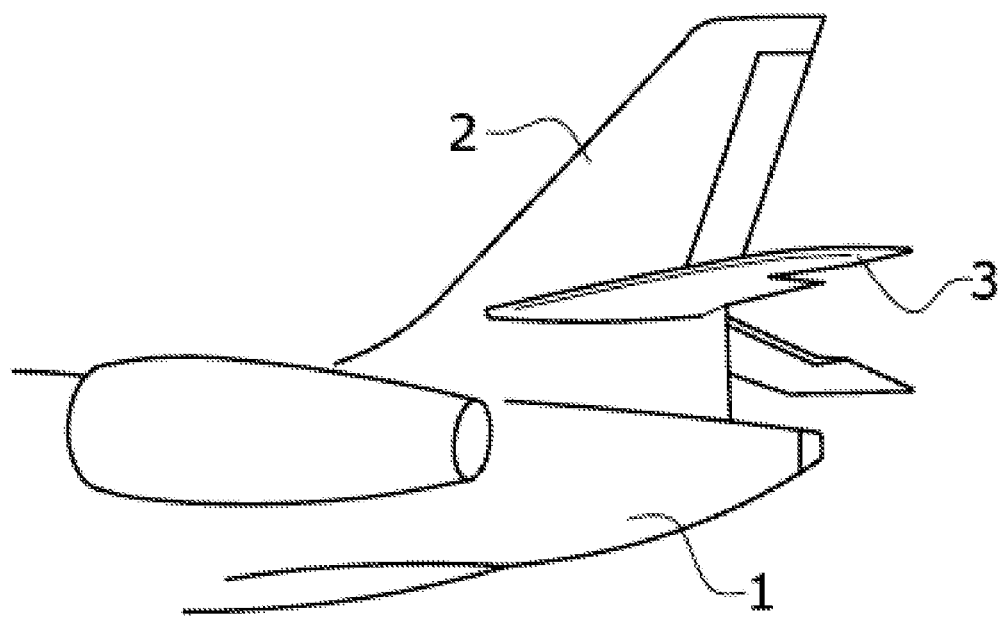
FIG. 3 shows a lateral view of an aircraft empennage known in the state of the art as Cross-tail.

FIG. 3 discloses a Cross-Tail configuration known in the state of the art. In this configuration, the horizontal tail plane (HTP) (3) crosses the vertical tail plane (VTP) (2) near its middle part.

Figure 4:
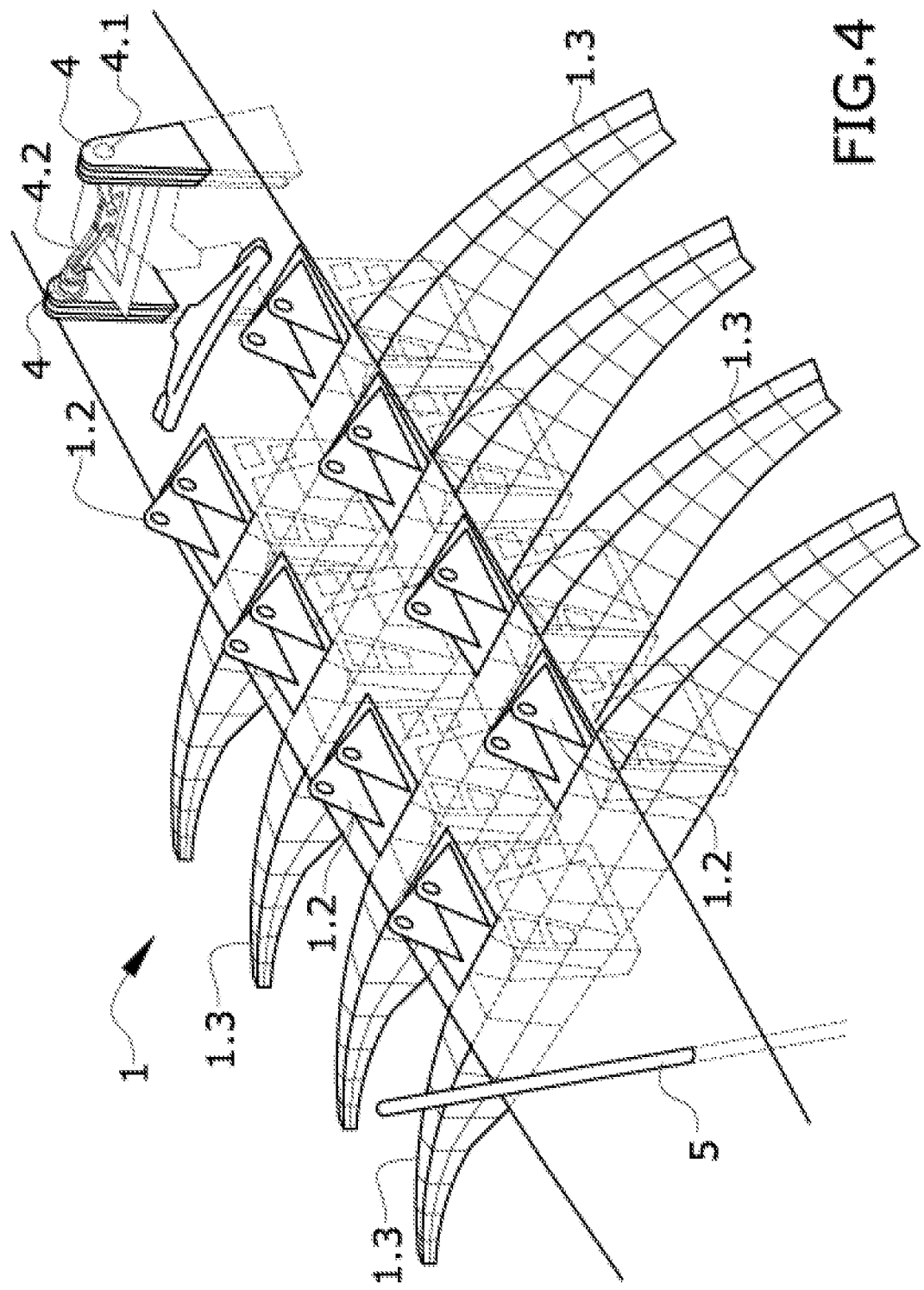
FIG. 4 shows a perspective view of an upper shell of the rear fuselage section showing the structural attachment of the vertical tail plane (VTP) and of the horizontal tail plane (HTP).

FIG. 4 discloses an upper shell of the rear fuselage section (1) showing the structural attachment of the vertical tail plane (VTP) (2). The rear fuselage section (1) comprises a skin (1.1) and internal reinforcing members, specifically, frames (1.3). The attachment of the vertical tail plane (VTP) (2) comprises vertical tail plane attachments (1.2) that are joined to the frames (1.3) and that crosses the skin (1.1) protruding from it (1.1) towards the vertical tail plane (VTP) (2). The shown attachment comprises pairs of lugs, each pair of lugs located between two consecutives frames (1.3).

FIG. 4 also discloses an embodiment of the attachment assembly attaching the framework (33) to the rear fuselage section (1). The attachment assembly crosses the skin (1.1) and extends between the frames (1.3) of the rear fuselage section (1) and the framework (33).

The attachment assembly shown in FIG. 4 comprises:
the rear attachment (4), specifically two lugs, extending between the frames (1.3) of the rear fuselage section (1) and the framework (33),
the front attachment (5) extending between the frames (1.3) of the rear fuselage section (1) and the framework (33).

FIG. 4 also illustrates the attachment assembly further comprising a fitting (4.2) configured for bearing the lateral loads of the horizontal tail plane (HTP) (3). The fitting (4.2) for bearing lateral loads extends between the two lugs of the rear attachment (4) and is aligned with the pivot (4.1).

Figure 5:
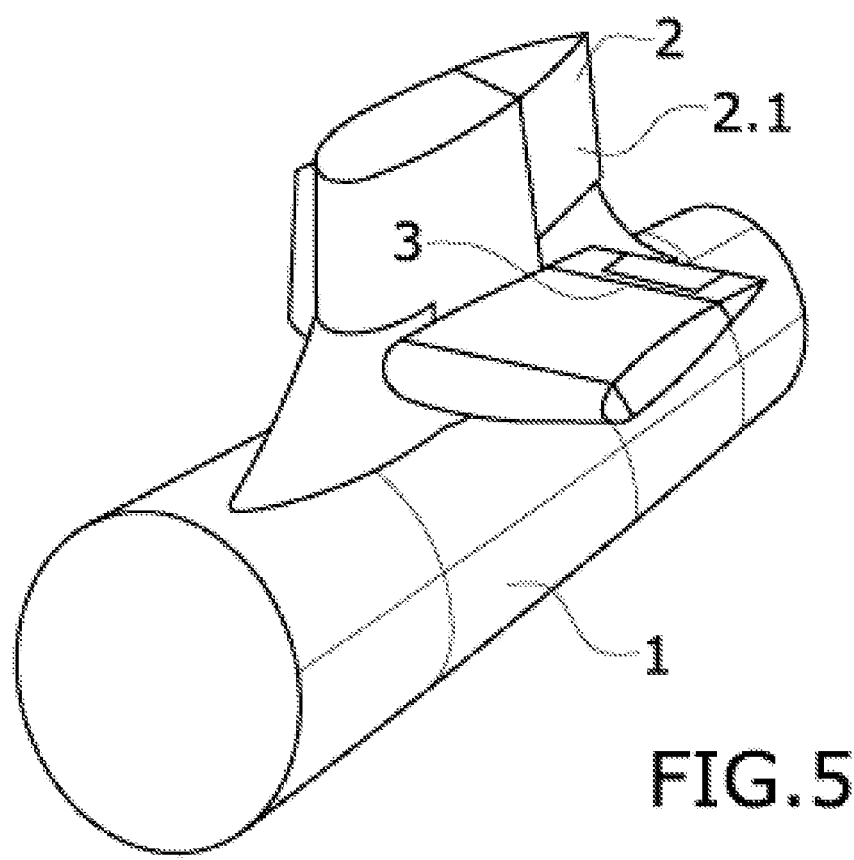
FIG. 5 shows a perspective view of an aircraft empennage according to an embodiment of the invention.

FIG. 5 discloses a perspective view of an embodiment of the invention. An aircraft empennage is shown in which are depicted:
the rear fuselage section (1),
the vertical tail plane (VTP) (2) attached to the rear fuselage section (1), and
the horizontal tail plane (HTP) (3) located at the root area of the vertical tail plane (2).

Figure 6:
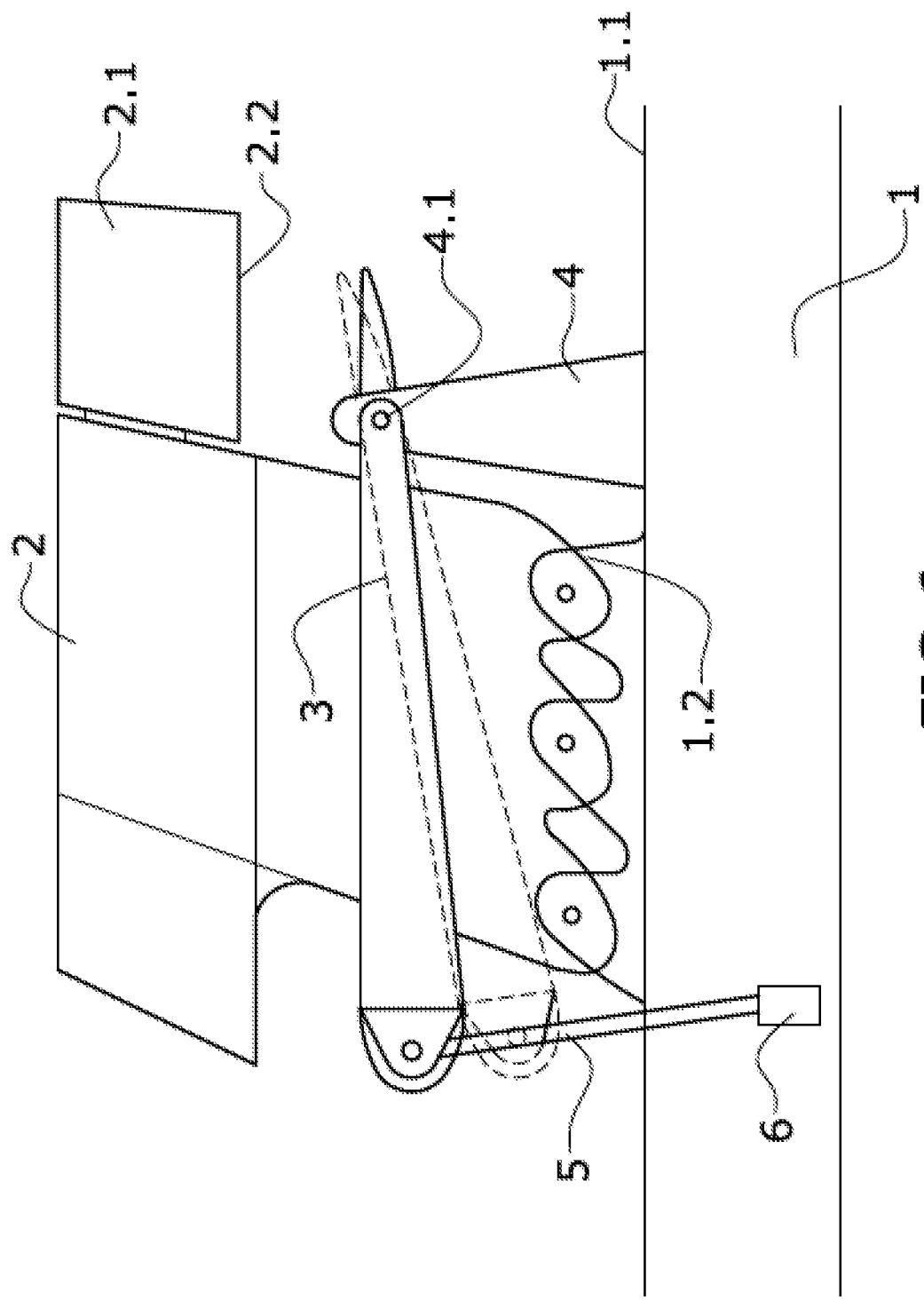
FIG. 6 shows a schematic lateral view of an embodiment of the invention showing the interfaces between the rear fuselage section, the vertical tail plane (VTP) and the horizontal tail plane (HTP).

FIG. 6 discloses a rear fuselage section (1) comprising vertical tail plane attachments (1.2) protruding from the skin (1.1) and being attached to the vertical tail plane (VTP) (2).

The shown vertical tail plane attachments (1.2) comprises three lugs. Alternatively, instead of having several independent lugs, a continuous fitting can be implemented.

It also shows that the horizontal tail plane (HTP) (3) is located at the lower part of the vertical tail plane (VTP) (2), i.e., it is located adjacent to the skin (1.1) of the rear fuselage section (1) at the root area of the vertical tail plane (VTP) (2). The horizontal tail plane (HTP) (3) is trimmable.

FIG. 6 also shows:
the rear attachment (4), and
the front attachment (5).

Figure 7:
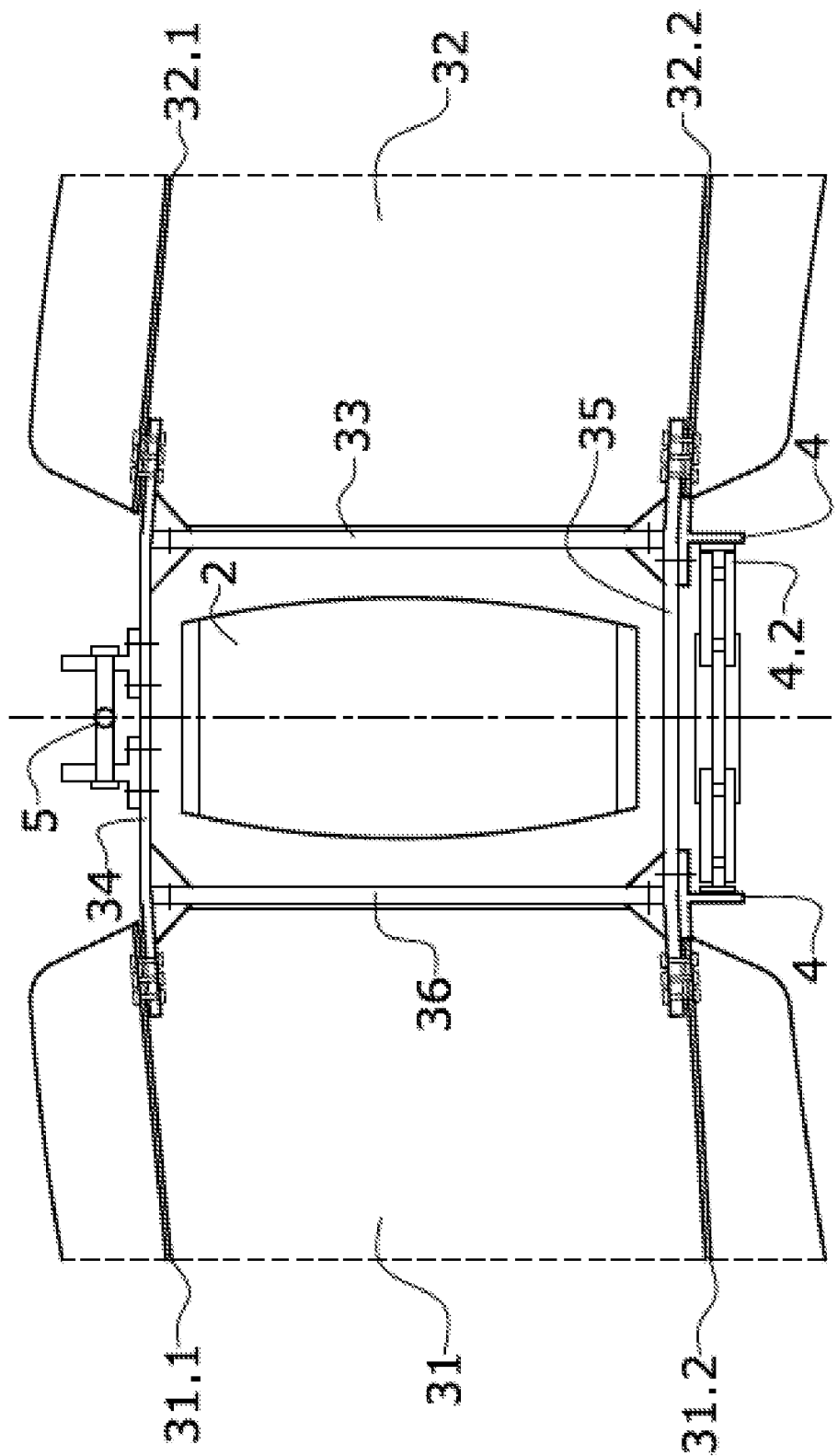
FIG. 7 shows a schematic plan view of the horizontal tail plane (HTP) and the vertical tail plane (VTP).

FIG. 7 discloses an embodiment of the invention showing a trimmable horizontal tail plane (HTP) (3) comprising:
The two lateral torsion boxes (31, 32).
The framework (33) which is located between the two lateral torsion boxes (31, 32). The framework (33) is connected to the two lateral torsion boxes (31, 32). The framework (33) comprises a front spar (34), a rear spar (35) and two ribs (36, 37). Each rib (36, 37) is located adjacent to a lateral torsion box (31, 32). Moreover, the framework (33) encloses a cross-section of the vertical tail plane (VTP) (2) such that a longitudinal portion of the vertical tail plane (VTP) (2) is surrounded by the framework (33).

The rear attachment (4) is attached to the rear spar (35) of the framework (33). The rear attachment (4) is also attached to the rear fuselage section (1), as it is shown in FIG. 6. The joint of the rear attachment (4) with the rear spar (35) is configured to be a pivot (4.1) of the trimmable horizontal tail plane (HTP) (3) as shown in FIG. 6.

FIG. 7 also discloses a plan view of the fitting (4.2) for bearing the lateral loads of the horizontal tail plane (HTP) (3) that extends between the two lugs of the rear attachment (4) and is aligned with the pivot (4.1). For the sake of clarity, FIG. 8 does not show the aforementioned fitting (4.2) to better show the rear spar (35).

The front attachment (5) is connected to the front spar (34) of the framework (33). The front attachment (5) is also connected to the rear fuselage section (1), as it is shown in FIG. 6. The front attachment (5) is configured to move the trimmable horizontal tail plane (HTP) (3) around the pivot (4.1) to control the angle of rotation of the horizontal tail plane (HTP) (3).

In the embodiment shown in FIG. 6, the front attachment (5) comprises an endless screw. Additionally, the front attachment (5) comprises an actuator (6), a trimmable horizontal stabilizers actuator (THSA), which is configured to control the angle of rotation of the horizontal tail plane (HTP) (3). The actuator (6) is connected to the endless screw. The endless screw is attached to the front attachment (5).

In the shown embodiment, the actuator (6) is placed inside the rear fuselage section (1), i.e., located on the side of the skin towards the median plane of the fuselage section. For that reason, the skin (1.1) of the rear fuselage section (1) comprises an opening to allow the endless screw to pass through it.

Furthermore, as the trimmable horizontal stabilizers actuator (THSA) (6) is kept inside the rear fuselage section (1), the vertical tail plane (VTP) (2) design is not penalized by the horizontal tail plane (HTP) (3) trimming actuation like in the case of the T-Tail and Cross-Tail configurations in which the vertical tail plane (VTP) (2) inner structure is impacted.

In the shown embodiment, the rear attachment (4) comprises a lug, specifically two lugs. Each lug is joined to the rear spar (35). Moreover, the two lugs are located aligned with the longitudinal direction of the framework ribs (36, 37) to minimize the effect of the loads on the rear spar (35). The attachment of these lugs to the framework (33) is implemented through bolts.

Figure 8:
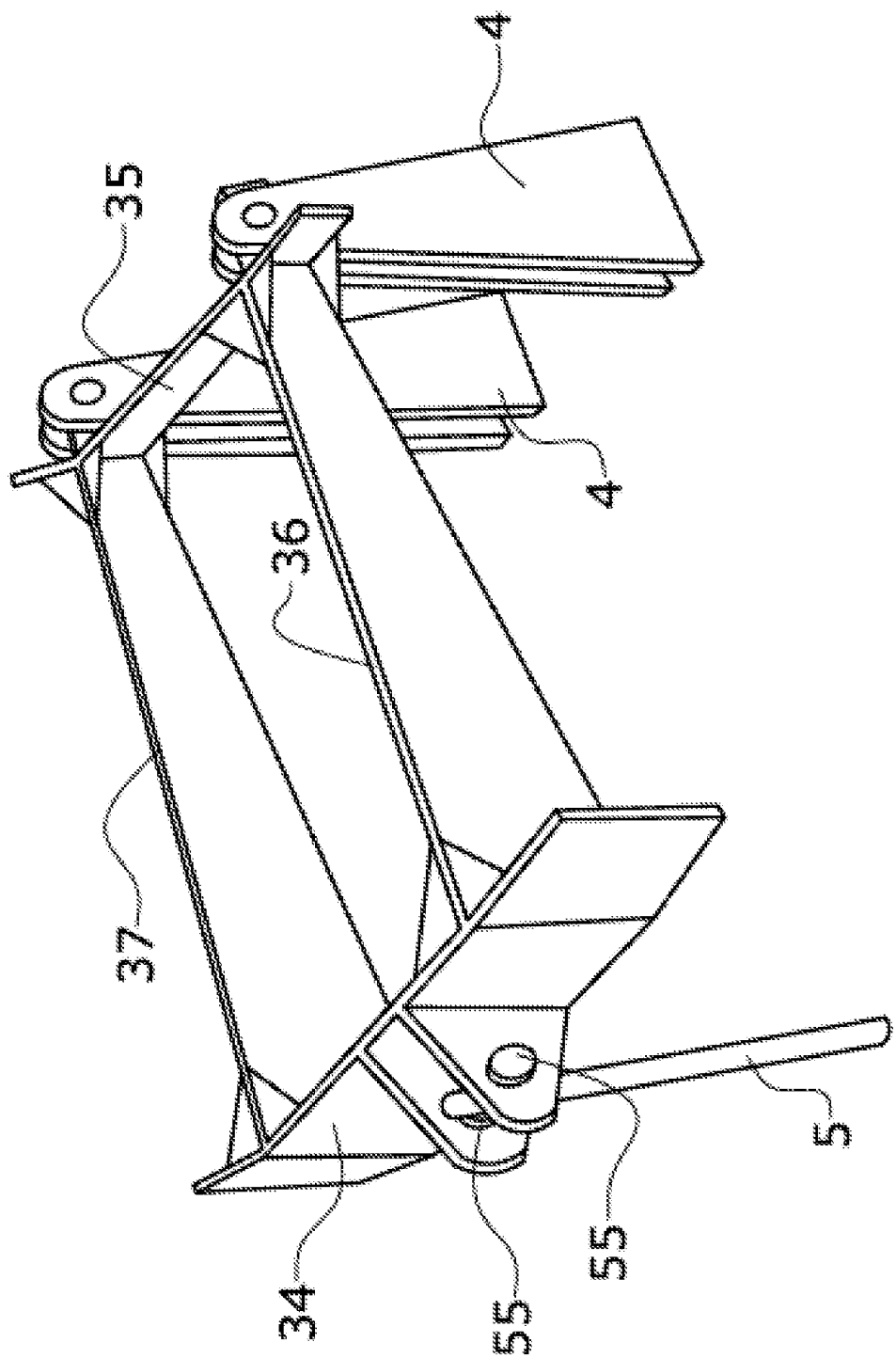
FIG. 8 shows a perspective view of an embodiment of the framework and of the front and the rear attachments to the rear fuselage section.

The front attachment (5) is placed near the longitudinal center of the front spar (34), to minimize the momentum by reducing the distance to the endless screw. More specifically, the front attachment (5) comprises two fittings (55) as it is shown in FIG. 8.

In a trimmable horizontal tail plane (HTP) (3), since the horizontal tail plane (HTP) (3) moves with respect to the vertical tail plane (VTP) (2) and the rear fuselage section (1), a standard clearance is left between the framework (33) and the other two structures in order to avoid any clash, as it is shown in FIGS. 6 and 7.

As previously stated, the framework (33) comprises two spars, front (34) and rear (35), and two ribs, left (36) and right (37). In order to attach the horizontal tail plane (HTP) (3) lateral boxes to the framework (33), the front spars (31.1, 32.1) and rear spars (31.2, 32.2) of the horizontal tail plane (HTP) (2) lateral boxes (31, 32) are joined respectively to the front spar (34) and rear spar (35) of the framework (33). Specifically, single lap-shear joints are used.

In addition, on top of the high loaded frames (1.3) defined in the rear fuselage section (1) to attach the vertical tail plane (VTP) (2), one additional high loaded frame will be needed in order to bear the loads coming from the rear support fittings. This additional high-loaded frame may be an intermediate one, or the rear fuselage closing frame like in the conventional empennage configuration.

In the case of the horizontal tail plane (HTP) (2) lateral box covers, they may be connected to the framework (33) by means of different structural solutions, like a single shear joint or a tension joint.

FIGS. 5 and 6 shows the horizontal tail plane (HTP) (3) located in the root area of the vertical tail plane (VTP) (2). The vertical tail plane (VTP) (2) comprises a rudder (2.1). In the shown embodiment, the rudder (2.1) comprises a lower edge (2.2) located adjacent to the rear attachment (4) of the horizontal tail plane (HTP) (3) with respect to the vertical direction of the aircraft empennage.

In an alternative embodiment, the horizontal tail plane (HTP) (3) may be located in an upper position of the vertical tail plane (VTP) (2).

Since the shape of the horizontal tail plane (HTP) (3) framework (33) is rectangular and the loading points from the horizontal tail plane (HTP) (3) are placed at the edges of the framework (33), it is necessary to stiffen the framework (33) in order to bear the momentum generated by these loads.

Since the inner area of the framework (33) is used in order to allocate the vertical tail plane (VTP) (2), the framework (33) is reinforced by means of corner fittings, ensuring there is no clash with the vertical tail plane (VTP) (2) surrounding structure.

The corner fittings and the lugs are so that the same bolts are used to attach these elements to the frame rear spar (35).

To manufacture the framework (33), two possibilities are depicted. To mechanize the full framework (33) using high performance metals. The framework (33) can be made in one piece. Another possibility is to have composite spars (34, 35) and ribs (36, 37) and metallic corner fittings to joint these elements among themselves. In an embodiment, the framework (33) may be manufactured together with one of the lateral torsion boxes (31, 32) or even the lateral torsion boxes (31, 32) and the framework (33) may be manufactured as one part.

The framework (33) may be covered by a fairing.

In order to allow the placement of the horizontal tail plane (HTP) (3) and the framework (33), the front and rear fairings of the vertical tail plane (VTP) (2) must have cut-outs where the framework (33) crosses their surface. These cut-outs must be big enough to grant rotation of the horizontal tail plane (HTP) (3), for example, +1° upwards and +15° downwards.

Figure 9:
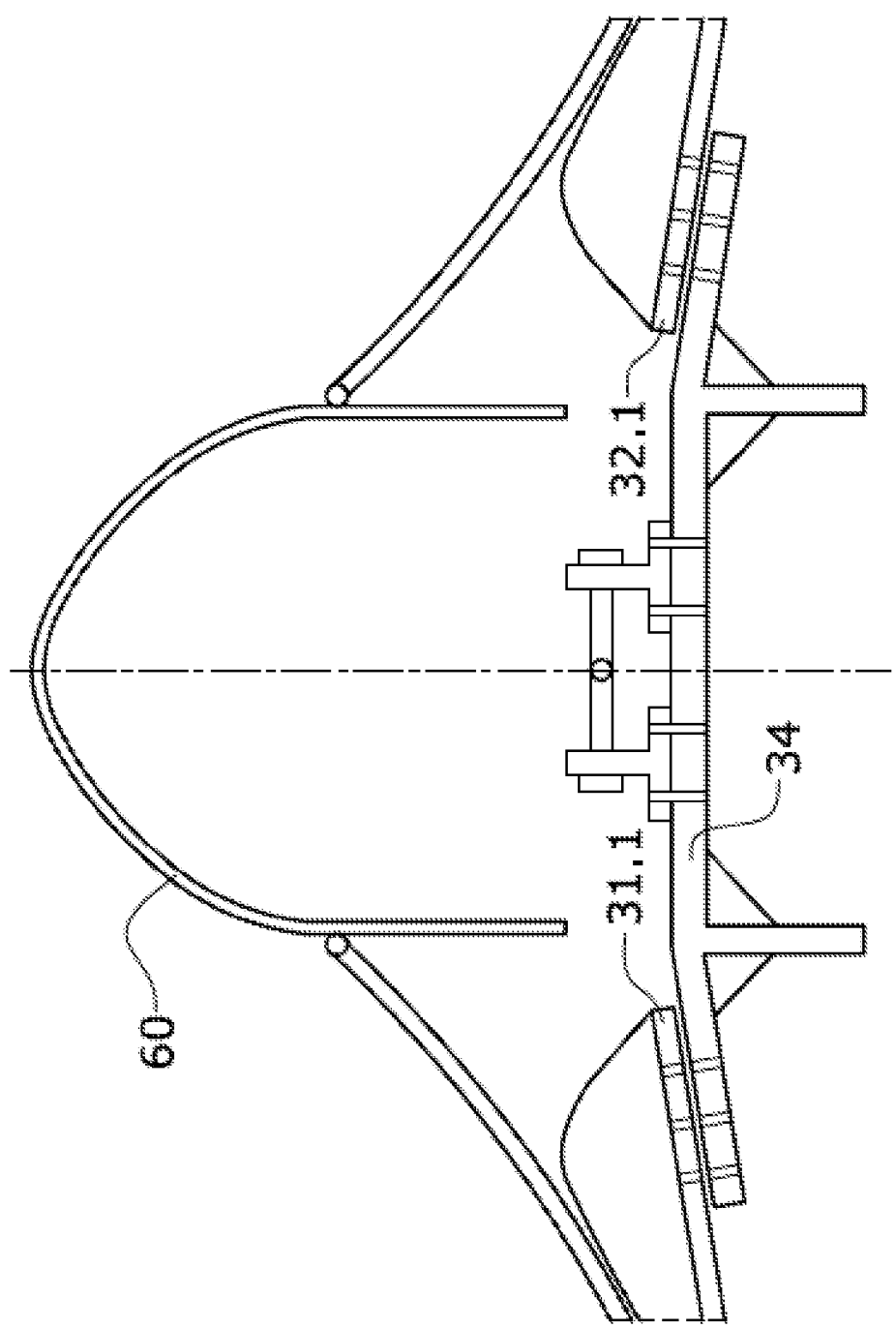
FIG. 9 shows a schematic plan view of an embodiment of the front spar of the framework and a dorsal fin covering the gap between the framework and the vertical tail plane (VTP).

In addition, the empennage comprises a dorsal fin (60) as shown in FIG. 9. The dorsal fin (60) closes the gap between the framework (33) and the vertical tail plane (VTP) (2) to minimize the aerodynamic drag. The surface of the dorsal fin (60) comprises at least two flat portions, one on each of its port and starboard sides, where the horizontal tail plane (HTP) (3) fairing is in contact with the dorsal fin (60), so as to let the HTP (3) move upward and downward.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft empennage, comprising:
a vertical tail plane,
a rear fuselage section comprising a skin and internal reinforcing members, the vertical tail plane being attached to the rear fuselage section,
a horizontal tail plane comprising two lateral torsion boxes,
wherein the horizontal tail plane further comprises:
a framework located between the two lateral torsion boxes and in connection with the two lateral torsion boxes, the framework comprising a front spar, a rear spar and two ribs extending between the front spar and the rear spar, each rib adjacent to a lateral torsion box, the framework enclosing a portion of the vertical tail plane along it-sthe spanwise direction of the vertical tail plane, and
an attachment assembly attaching the framework to the rear fuselage section, the attachment assembly crossing the skin and extending between the internal reinforcing members of the rear fuselage section and the framework.

2. The aircraft empennage, according to claim 1, wherein the attachment assembly attaching the framework to the rear fuselage section comprises:
a rear attachment extending between the internal reinforcing members of the rear fuselage section and the rear spar of the framework, and a front attachment extending between the internal reinforcing members of the rear fuselage section and the front spar of the framework.

3. The aircraft empennage, according to claim 2, wherein the horizontal tail plane is trimmable, the connection between the rear attachment and the framework being configured to be a pivot of the trimmable horizontal tail plane and the front attachment being configured to move the trimmable horizontal tail plane around the pivot to control an angle of rotation of the horizontal tail plane.

4. The aircraft empennage, according to claim 2, wherein the front attachment is joined to the framework near a longitudinal center of the front spar.

5. The aircraft empennage, according to claim 2, wherein the rear attachment comprises two lugs, each lug joined to the rear spar of the framework aligned with a longitudinal direction of each rib.

6. The aircraft empennage, according to claim 3, wherein the front attachment comprises an endless screw.

7. The aircraft empennage, according to claim 6, wherein the front attachment comprises an actuator connected to the endless screw and configured to move the trimmable horizontal tail plane around the pivot to control the angle of rotation of the horizontal tail plane.

8. The aircraft empennage, according to claim 7, wherein the actuator is placed inside the rear fuselage section.

9. The aircraft empennage, according to claim 8, wherein the skin of the rear fuselage section comprises an opening that allows a passage of the endless screw.

10. The aircraft empennage, according to claim 1, wherein the framework is located at a root area of the vertical tail plane.

11. The aircraft empennage, according to claim 10, wherein the framework of the horizontal tail plane is located adjacent to the skin of the rear fuselage section with respect to the spanwise direction of the vertical tail plane.

12. The aircraft empennage, according to claim 1, wherein the vertical tail plane comprises a rudder, the rudder comprising a lower edge located adjacent to the rear attachment of the horizontal tail plane with respect to the spanwise direction of the vertical tail plane.

13. The aircraft empennage, according to claim 1, wherein the two lateral torsion boxes comprise a front spar and a rear spar, and the front spar of the framework being joined to the front spars of the lateral torsion boxes and the rear spar of the framework being joined to the rear spars of the lateral torsion boxes.

14. The aircraft empennage, according to claim 1, wherein the spars and the ribs of the framework are metallic.

15. The aircraft empennage, according to claim 1, wherein the spars and the ribs are made in composite materials.

* * * * *